(12) United States Patent
Osuka et al.

(10) Patent No.: US 12,496,387 B2
(45) Date of Patent: Dec. 16, 2025

(54) FIBER BUNDLE, METHOD FOR PRODUCING SAME, AND PURIFICATION COLUMN

(71) Applicant: TORAY Industries, Inc., Tokyo (JP)

(72) Inventors: Tomoaki Osuka, Otsu (JP); Hiroaki Fujieda, Otsu (JP); Yoshiyuki Ueno, Otsu (JP); Hirokazu Sakaguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 829 days.

(21) Appl. No.: 17/765,660

(22) PCT Filed: Oct. 7, 2020

(86) PCT No.: PCT/JP2020/037977
§ 371 (c)(1),
(2) Date: Mar. 31, 2022

(87) PCT Pub. No.: WO2021/070857
PCT Pub. Date: Apr. 15, 2021

(65) Prior Publication Data
US 2022/0379000 A1     Dec. 1, 2022

(30) Foreign Application Priority Data

Oct. 8, 2019   (JP) .................................. 2019-184920

(51) Int. Cl.
*B01J 20/28* (2006.01)
*A61M 1/36* (2006.01)

(52) U.S. Cl.
CPC ...... *A61M 1/3679* (2013.01); *B01J 20/28023* (2013.01)

(58) Field of Classification Search
CPC ... A61M 1/3606; A61M 1/3679; B01D 15/22; B01J 20/261; B01J 20/262;
(Continued)

(56) References Cited

U.S. PATENT DOCUMENTS

| 2011/0033704 A1 | 2/2011 | Nakao et al. |
| 2019/0076819 A1 | 3/2019 | Fujieda et al. |

FOREIGN PATENT DOCUMENTS

| EP | 3 450 596 A1 | 3/2019 |
| JP | 11-309353 A | 11/1999 |

(Continued)

OTHER PUBLICATIONS

International Search Report, issued in PCT/JP2020/037977, dated Dec. 22, 2020.
(Continued)

*Primary Examiner* — Dirk R Bass
(74) *Attorney, Agent, or Firm* — Birch, Stewart, Kolasch & Birch, LLP

(57) ABSTRACT

An object of the present invention is to provide a purification column which is a small purification column in which a volume of a liquid to be treated is reduced in order to reduce the amount of blood to be taken out and which realizes a low pressure loss and has high adsorption performance. The present invention provides a fiber bundle including a plurality of porous fibers that satisfies the following requirements (A) to (E):
(A) the porous fiber has a non-hollow shape,
(B) an arithmetic average roughness (dry Ra value) of a surface of the porous fiber in a dry state is 11 nm or more and 30 nm or less,
(C) an arithmetic average roughness (wet Ra value) of a surface of the porous fiber in a wet state is 12 nm or more and 40 nm or less, (Continued)

(D) a value represented by wet Ra/dry Ra is 1.05 or more, and (E) a linear rate of the fiber bundle represented by (length of fiber bundle)/(length of one porous fiber) is 0.97 or more and 1.00 or less.

9 Claims, 2 Drawing Sheets

(58) Field of Classification Search
CPC ............ B01J 20/28004; B01J 20/28011; B01J 20/28023; B01J 20/3092; B01J 2220/58
See application file for complete search history.

(56) References Cited

FOREIGN PATENT DOCUMENTS

| | | |
|---|---|---|
| JP | 2005-152295 A | 6/2005 |
| JP | 2005-224604 A | 8/2005 |
| JP | 2009-254695 A | 11/2009 |
| JP | 2017-185221 A | 10/2017 |
| JP | 2017-186722 A | 10/2017 |

OTHER PUBLICATIONS

Written Opinion of the International Searching Authority, issued in PCT/JP2020/037977, dated Dec. 22, 2020.
Extended European Search Report for European Application No. 20874844.2, dated Sep. 6, 2023.

FIBER BUNDLE, METHOD FOR PRODUCING SAME, AND PURIFICATION COLUMN

TECHNICAL FIELD

The present invention relates to a fiber bundle used for removing a substance to be adsorbed in a liquid to be treated by adsorption, a method for producing the fiber bundle, and a purification column.

BACKGROUND ART

A purification column used for removing a substance to be adsorbed in a liquid to be treated by adsorption has been used in a wide range of fields. In particular, in the medical field, it has been used for blood purification therapy in which a liquid to be treated such as blood is taken out of the body, and a pathogenic substance and the like in the liquid to be treated are removed by a purification column, and purified and returned. The purification column used here may also be referred to as a blood purification column. These blood purification therapies have fewer side effects than a treatment method in which a drug is directly administered into a patient's body, which is advantageous. On the other hand, when a large amount of blood is taken out of the body, side effects such as a decrease in blood pressure and anemia may be caused. Therefore, it is required to reduce the amount of blood taken out of the body of a patient (also referred to as "amount of blood to be taken out") as much as possible.

In order to reduce the amount of blood to be taken out, it is necessary to reduce the column size in the purification column, but the efficiency of blood purification is reduced simply by reducing the column size.

Therefore, adsorbents and columns intended to suppress the amount of liquid to be treated and achieve high adsorption performance have been developed.

For example, Patent Document 1 discloses an invention of a column using beads as an adsorbent.

Patent Document 2 discloses a column in which fibers are packed and arranged in the column.

Patent Document 3 discloses that by using non-hollow fibers as the adsorbent and designing and optimizing the column, residual of the liquid to be treated (in the case of blood, residual blood) is suppressed, and adsorption performance of the substance to be adsorbed can be improved.

Patent Document 4 discloses a blood purification membrane in which a center surface average roughness of a blood-contacting surface in a wet state is less than a certain value.

PRIOR ART DOCUMENTS

Patent Documents

Patent Document 1: Japanese Patent Laid-open Publication No. 2016-215156
Patent Document 2: Japanese Patent Laid-open Publication No. 2009-29722
Patent Document 3: Japanese Patent Laid-open Publication No. 2017-185221
Patent Document 4: Japanese Patent Laid-open Publication No. 2005-224604

Non-Patent Document

Non-Patent Document 1: Kazuhiko Ishikiriyama et al.; JOURNAL OF COLLOID AND INTERFACE SCIENCE, 171, 103-111, (1995)
Non-Patent Document 2: Kazuhiko Ishikiriyama et al.; JOURNAL OF COLLOID AND INTERFACE SCIENCE, 173, 419-428, (1995)
Non Patent Document 3: Summary of the 38th Symposium on pore size heat measurement 38 to 39

SUMMARY OF THE INVENTION

Problems to be Solved by the Invention

In downsizing the column size, when only the length of a column is reduced, a liquid to be treated does not uniformly contact an adsorbent packed in the column, and there is a possibility that a short pass in which the liquid to be treated flows only in the vicinity of a central portion of a shaft is likely to occur. On the other hand, when only the cross-sectional area of the column is reduced, the pressure to the liquid to be treated entering the column increases, and the pressure to the liquid to be treated from the column decreases. In a process of generating this pressure loss, in a case where the liquid to be treated is particularly blood, the high pressure stimulates and activates blood cell components, so that the blood cell components may be damaged and hemolysis may occur.

Therefore, in order to realize an even flow of the liquid to be treated in the column and suppress an increase in the pressure loss, it is necessary to reduce both the cross-sectional area and the length of the column.

However, in the prior art disclosed in Patent Documents 1 to 3, in a case where a purification column having a small amount of the liquid to be treated and a low capacity is prepared, it is difficult to obtain a purification column having suppressed pressure loss and excellent adsorption performance in the following points.

In Patent Document 1, in a case where the adsorbent is in the form of beads, a surface area per volume of the adsorbent is minimized because the adsorbent is spherical, and when a bead diameter is reduced or the amount of beads to be filled is increased in order to increase the surface area per volume, a gap between the beads becomes narrowed, which may increase the pressure loss.

Patent Document 2 discloses beads, hollow fibers, and non-hollow fibers as adsorbents, but there is a problem in securing a surface area contributing to adsorption. In addition, it is possible to increase the total surface area contributing to adsorption by increasing the number of filled fibers by reducing the diameter of the fibers; however, in this case, a gap between the adsorbents is narrowed, and the flow path resistance is increased. As the flow path resistance increases, the pressure loss increases. Therefore, there is still a problem in achieving both low pressure loss and high adsorption performance in downsizing the column size.

Patent Document 3 discloses that flowability can be improved and pressure loss can be reduced by suppressing meandering of fibers contained in a fiber bundle. However, in a case where the pressure loss in examples is also relatively high, and the column is downsized as it is, it is considered that both high adsorption performance and low pressure loss are hardly achieved.

Patent Document 4 relates to a separation membrane, and does not achieve both adsorption and suppression of hemolysis due to stimulation to blood cell components.

Therefore, an object of the present invention is to provide a purification column which is a small purification column in which a volume of a liquid to be treated is reduced in order to reduce the amount of blood to be taken out and which realizes a low pressure loss and has high adsorption performance.

Solutions to the Problems

That is, the present invention provides a fiber bundle (fiber bundle (I) of the present invention) including a plurality of porous fibers that satisfies the following requirements (A) to (E):
(A) the porous fiber has a non-hollow shape,
(B) an arithmetic average roughness (dry Ra value) of a surface of the porous fiber in a dry state is 11 nm or more and 30 nm or less,
(C) an arithmetic average roughness (wet Ra value) of a surface of the porous fiber in a wet state is 12 nm or more and 40 nm or less,
(D) a value represented by wet Ra/dry Ra is 1.05 or more, and
(E) a linear rate of the fiber bundle represented by (length of fiber bundle)/(length of one porous fiber) is 0.97 or more and 1.00 or less.

The present invention also provides a purification column (purification column (I) of the present invention) in which the fiber bundle of the present invention is housed substantially in parallel to a longitudinal direction of a tubular case, and which includes headers having an inlet port and an outlet port for a liquid to be treated are attached to both ends of the tubular case, respectively.

The present invention also provides a purification column (purification column (II) of the present invention) in which a fiber bundle formed by bundling two or more fibers is housed substantially in parallel to a longitudinal direction of a tubular case, and which includes headers having an inlet port and an outlet port for a liquid to be treated are attached to both ends of the tubular case, respectively, and satisfies the following requirements (i) to (v):
(i) when a diameter of an inscribed circle is defined as Di and a diameter of a circumscribed circle is defined as Do in a transverse cross-section of the fiber, a modification degree of the transverse cross-section of the fiber represented by Do/Di is 1.3 or more and 8.5 or less,
(ii) a filling rate of the fibers in a housing portion is within a range of 40% or more and 73% or less,
(iii) an inner diameter of the housing portion is 32 mm or more and 60 mm or less,
(iv) a linear rate of fibers represented by (length of fiber bundle accommodated in purification column)/(length of one fiber accommodated in purification column) is 0.97 or more and 1.00 or less, and
(v) a capacity of a flow path of the liquid to be treated in the housing portion is within a range of 5 mL or more and 60 mL or less.

The present invention also provides a method for producing a fiber bundle, the method including bundling the fibers under conditions that satisfy the following (a) and (b):
(a) a tension of the fiber at the time of winding the fiber around a spool is 0.5 gf/fiber or more and 10.0 gf/fiber or less, and
(b) a traverse movement distance (a distance of parallel movement in a vertical direction from an advancing direction of the fiber) is 0.1 mm or more and 30 mm or less in a time during which the spool makes one rotation.

Effects of the Invention

According to the present invention, it is possible to obtain a purification column which is a small purification column in which a volume of a liquid to be treated is reduced in order to reduce the amount of blood to be taken out and which realizes a low pressure loss and has high adsorption performance.

EMBODIMENTS OF THE INVENTION

Figure 1:
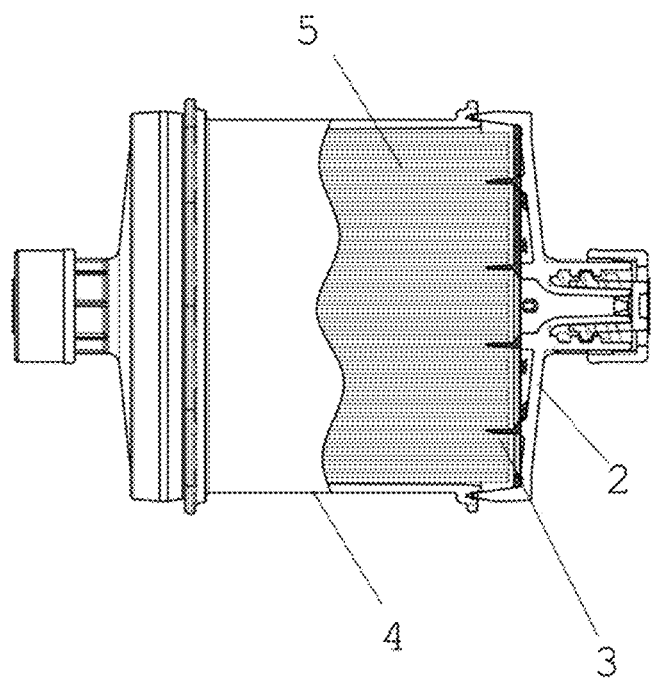
FIG. 1 is a side view illustrating an embodiment of a purification column according to the present invention.

Hereinafter, the present invention will be described in detail.

In the present invention, "or more" means the same as or more than the numerical value indicated therein. In addition, "or less" means the same as or less than the numerical value indicated therein.

In addition, when there is no particular distinction between "fiber bundle (I) of the present invention"/"purification column (II) of the present invention", such as "fiber in the present invention", the fiber bundle (I) of the present invention and the purification column (II) of the present invention are considered to apply in common to both cases.
<Fiber>

The constituent material of the fiber in the present invention is not particularly limited, and a polymer material is suitably used from the viewpoint of ease of molding processing, cost, and the like. For example, polymethyl methacrylate (hereinafter, referred to as PMMA), polyacrylonitrile (hereinafter, referred to as PAN), polysulfone, polyethersulfone, polyarylethersulfone, polypropylene, polystyrene, polycarbonate, polylactic acid, polyethylene terephthalate, cellulose, cellulose triacetate, an ethylene-vinyl alcohol copolymer, polycaprolactam, and the like are used. In addition, in a case of the fiber, the fiber preferably contains a material having a property of adsorbing a protein or the like by hydrophobic interaction, and examples thereof include PMMA and PAN. In the case of the fiber, the fiber is preferably used because it has a homogeneous structure, the pore size distribution is easily controlled, and relatively sharp substance separation is possible. Furthermore, since the amorphous polymer is not crystallized in a spinning step and a subsequent step, the amorphous polymer is excellent in spinnability, continuous productivity, and processing moldability. In particular, since PMMA is an amorphous polymer and has high transparency, an internal state of the fiber is also relatively easily observed, so that a perfusion state of the liquid to be treated such as fouling can be easily evaluated, which is preferable.

In addition, the surface of the fiber may be modified for the purpose of improving the adsorption performance of the substance to be adsorbed by controlling a ligand and a charged state and controlling the surface characteristics such as friction and biocompatibility of the film by a polymer functional group. The modification means that a polymer or a low molecular weight compound is immobilized on a film surface. Here, the immobilized state is not particularly limited, and may be chemically bonded, or may be a physical bond such as an electrostatic interaction or a hydrogen bond. The modification method is not particularly limited, and for example, by irradiating the fiber with radiation in a state where the fiber is in contact with an aqueous solution containing a polymer, a modified fiber in which a hydrophilic polymer is immobilized on the surface can be obtained. In a case where a purification column is used for medical equipment or the like, irradiation with radiation can also simultaneously serve as sterilization.

In addition, the fiber in the present invention preferably has a porous structure having pores inside the fiber. The fiber in the fiber bundle (I) of the present invention has a porous structure having pores inside the fiber. By adopting the porous structure, the substance to be adsorbed can be adsorbed not only on the fiber surface but also in pores inside the fiber, and the adsorption performance per volume is improved.

An average pore radius of the fiber is preferably 0.8 nm or more, more preferably 1.5 nm or more, still more preferably 2.0 nm or more, and even more preferably 2.5 nm or more. On the other hand, it is preferably 90 nm or less, more preferably 55 nm or less, still more preferably 30 nm or less, and even more preferably 22 nm or less. When the average pore radius is in the above preferred range, the substance to be adsorbed is adsorbed on the fiber surface, and in addition, the substance to be adsorbed diffuses into the fiber and is adsorbed even in the pores inside the fiber, so that the adsorption efficiency is improved.

The average pore size, pore volume, and pore size distribution of the fibers having a porous structure can be determined by measuring the freezing point depression caused by capillary aggregation of water in the pores using a differential scanning calorimeter (DSC) that can be measured in a water-containing state. Specifically, after the adsorbent is rapidly cooled to −55° C., the temperature is raised to 5° C. at 0.3° C./min to perform measurement, so that the temperature is calculated from the obtained curve. For details, refer to the description of Non-Patent Document 1. In addition, the primary average pore size, that is, the average pore radius in the present invention is obtained from the following Equation (2) of Non-Patent Document 3 based on Equation (1) disclosed in Non-Patent Document 2. Here, the primary average pore size is i=1, and this value corresponds to the average pore size.

[Equation 1]
$$\frac{dn(R)}{dR} = \frac{1}{\pi R^2 h} \frac{dV}{dR} \quad (1)$$

[Equation 2]
$$i\text{-}th \text{ average pore size} = \frac{\int_0^\infty R^i \left(\frac{dV}{dR}\frac{1}{R^2}\right)dR}{\int_0^\infty R^{i-1}\left(\frac{dV}{dR}\frac{1}{R^2}\right)dR} \quad (2)$$

The porous fiber in the present invention preferably has an opening ratio of an opening on the fiber surface, that is, the surface opening ratio of 0.1% or more and 30% or less. The surface opening in the present invention does not include pores inside the fiber, and represents holes and voids on the surface of the porous fiber classified as black portions by the following measurement method. By setting the surface opening ratio to 0.1% or more, more preferably 0.5% or more, still more preferably 1% or more, and even more preferably 2% or more, a flow path to the inside of the fiber can be secured, and the adsorption performance is improved. In addition, by setting the surface opening ratio to 30% or less, more preferably 25% or less, still more preferably 20% or less, and even more preferably 15% or less, it is possible to suppress the collision between the components in the blood and the fiber surface in the treatment of the blood and to suppress hemolysis by the smooth surface.

The fiber in the present invention preferably has a homogeneous porous structure in the transverse cross-sectional direction. In the porous fiber, the substance to be adsorbed diffuses into the fiber and also adsorbs the substance to be adsorbed to pores inside the fiber. Therefore, the porous fiber having a homogeneous porous structure can contribute to the adsorption efficiency including the inside of the fiber.

Here, the homogeneous porous structure refers to a porous structure in which the ratio of the average pore size in the adjacent surface part of the fiber to the average pore size in the center portion part of the fiber (average pore size in the adjacent surface part/average pore size in the center portion part) is 0.50 times or more and 3.00 times or less. It is preferably 0.75 times or more and 2.00 times or less, and more preferably 0.85 times or more and 1.50 times or less.

Next, a method for determining a homogeneous structure in the present invention will be described. First, the porous fiber is sufficiently moistened and then immersed in liquid nitrogen, and moisture in the pores is instantaneously frozen in the liquid nitrogen. Thereafter, the porous fiber is quickly folded, and moisture frozen in a vacuum dryer of 0.1 torr (13.3 Pa) or less is removed in a state where the fiber cross section is exposed to obtain a dried sample. Thereafter, a thin film of platinum (Pt), platinum-palladium (Pt—Pd), or the like is formed on the fiber surface by sputtering to obtain an observation sample. A cross section of the sample is observed with a scanning electron microscope (for example, manufactured by Hitachi High-Tech Corporation, S-5500). Here, a radius passing through the center point of the fiber cross section is optionally selected, a concentric circle passing through points dividing a line segment of this radius into five equal lengths is drawn, a region including the center point is defined as a center portion part, and a side closest to the outer periphery portion is defined as an adjacent surface part. The equivalent circle diameter of the hole present in each of the center portion part and the adjacent surface part is obtained, and an average pore size in each region is obtained. In the calculation of the average pore size in each region, a range of 2 μm×2 μm is optionally selected at 20 locations with a scanning electron microscope (50,000 times), and the average pore size is calculated by measuring a portion including the entire pores in a photographed photograph. In the measurement of the hole diameter, a transparent sheet is overlaid on a printed electron microscope image, and a hole portion is filled in black with a black pen or the like. Thereafter, by copying the transparent sheet to white paper, the hole portion is clearly distinguished from black and a non-hole portion is clearly distinguished from white, and the hole diameter is obtained by image analysis software.

In the fiber bundle (I) of the present invention, it is important that an arithmetic average roughness (dry Ra) of the fiber surface of the porous fiber in a dry state is 11 nm or more and 30 nm or less (requirement (B)). By setting dry Ra to 11 nm or more, preferably 12 nm or more, more preferably 13 nm or more, and still more preferably 14 nm or more, irregularities are present on the fiber surface, the flow in the vicinity of the surface is disturbed, a boundary layer between the fiber surface and the substance in the liquid to be treated is thinned, and the adsorption performance can be improved. In addition, by setting the dry Ra to 30 nm or less, preferably 28 nm or less, more preferably 26 nm or less, and still more preferably 24 nm or less, in a case where the liquid to be treated is blood, it is possible to suppress the frequency of contact, collision, and rubbing between blood cells and the fiber surface, and to suppress release of hemoglobin inside the red blood cells into the blood (hemolysis) due to damage and activation of the blood cells.

In the fiber according to the present invention, the arithmetic average roughness (wet Ra) of the fiber surface in a wet state is preferably 12 nm or more and 40 nm or less. In addition, the fiber bundle (I) of the present invention, it is important that an arithmetic average roughness (wet Ra) of the fiber surface of the porous fiber in a dry state is 12 nm or more and 40 nm or less (requirement (C)). By setting wet Ra to 12 nm or more, preferably 13 nm or more, more preferably 14 nm or more, and still more preferably 15 nm or more, irregularities are present on the fiber surface, the flow in the vicinity of the surface is disturbed, a boundary layer between the fiber surface and the substance in the liquid to be treated is thinned, and the adsorption performance can be improved. In addition, by setting the wet Ra to 40 nm or less, preferably 38 nm or less, more preferably 36 nm or less, and still more preferably 34 nm or less, in a case where the liquid to be treated is blood, it is possible to suppress the frequency of contact, collision, and rubbing between blood cells and the fiber surface, and to suppress release of hemoglobin inside the red blood cells into the blood (hemolysis) due to damage and activation of the blood cells.

In the fiber bundle (I) of the present invention, it is important that the value obtained by dividing wet Ra of the porous fiber by dry Ra is 1.05 or more (requirement (D)). When wet Ra/dry Ra is 1.05 or more, molecular chains on the surface of the porous fiber can be sufficiently swollen when brought into contact with a liquid. Then, the adhesion amount of useful plasma proteins such as immunoglobulins is reduced, and it is possible to suppress an undesirable influence such as a decrease in immunogenicity.

Regarding the shape (non-hollow shape and a hollow shape) of the fiber in the present invention, the non-hollow fiber is preferable. In addition, it is important that the shape of the porous fiber in the fiber bundle (I) of the present invention is a non-hollow shape (requirement (A)). In the case of a straw-shaped hollow fiber having a cavity inside the fiber, when a liquid to be treated is passed into and out of the hollow fiber, a pressure difference occurs between the inside and the outside, the liquid to be treated stagnates due to the pressure difference, and when the liquid to be non-treated is blood, there is a possibility that a phenomenon called residual blood adheres to the inside and remains, but the non-hollow fiber can prevent this phenomenon.

The fiber in the present invention preferably has a modified cross-sectional shape. The fibers arranged in the purification column (II) of the present invention have a modified cross-sectional shape. When the fiber has the modified cross-sectional shape, the surface area per volume can be increased, and the adsorption performance as a purification column can be improved. The modification degree of the modified cross-section of the fiber can be expressed by the modification degree. Here, the modification degree is a value represented by the ratio of the diameters of the inscribed circle and the circumscribed circle when the transverse cross-section of the fiber is observed, that is, the ratio Do/Di of the diameter Di of the inscribed circle and the diameter Do of the circumscribed circle. When fibers having a modified cross-section are adopted, there is a possibility that stimulation to blood cells and the like becomes greater as compared with circular fibers, and thus it is preferable to apply the fiber bundle (I) of the present invention.

Here, the modified cross-section may have a shape maintaining symmetry such as line symmetry or point symmetry or may have an asymmetric shape. When it is determined that the modified cross-section substantially retains line symmetry and point symmetry, the inscribed circle is the largest circle inscribed in the line forming an outline of the fiber in the transverse cross-section of the fiber, and the circumscribed circle is a circle circumscribed in a line forming the outline of the fiber in the transverse cross-section of the fiber.

On the other hand, when it is determined that the modified cross-section has a shape that does not retain line symmetry or point symmetry at all, an inscribed circle and a circumscribed circle are defined as follows. The inscribed circle is a circle that is inscribed on at least two points with the line forming the outline of the fiber, exists only inside the fiber, and has the maximum radius that can be taken in a range in which the circumference of the inscribed circle and the line forming the outline of the fiber do not intersect. The circumscribed circle is a circle that is circumscribed on at least two points on the line indicating the outline of the fiber, exists only outside the transverse cross-section of the fiber, and has a minimum radius that can be taken in a range in which the circumference of the circumscribed circle and the outline of the fiber do not intersect.

The modification degree Do/Di of the transverse cross-section of the fiber in the present invention is preferably 1.3 or more and 8.5 or less. In addition, it is important that the modification degree of the transverse cross-section of the fiber in the purification column (II) of the present invention is 1.3 or more and 8.5 or less (requirement (i)). By setting the modification degree to 1.3 or more, preferably 1.5 or more, more preferably 1.8 or more, and still more preferably 2.0 or more, the surface area per volume can be increased, and the ability of the fiber to adsorb a substance to be adsorbed can be improved. On the other hand, by setting the modification degree to 8.5 or less, preferably 6.5 or less, more preferably 4.0 or less, and still more preferably 3.7 or less, the breaking strength of the fiber can be maintained, and bending, cutting, and the like of a convex portion and a protruding portion can be prevented. In addition, when a spinning solution is rapidly cooled using a gas or a liquid at the time of spinning into fibers, the excessive presence of the convex portions or protruding portions hinders the flow of wind or liquid. As a result, since the inside of the fiber is slowly cooled, unevenness tends to occur in a microstructure such as a fiber shape, a pore, and a surface opening.

Examples of the fiber transverse cross-sectional shape of the fiber having a protrusion include an oval, an L-shape, a chevron shape, and the like in the case of two fibers. In a case of three fibers, there are a Y-shape, a T-shape, and the like. In a case of four fibers, a cross is obtained, and in a case of five fibers, a star is obtained. When the fiber in the present invention is formed by rapidly cooling the spinning solution using a gas or a liquid, the number of protrusions is appropriately selected so as to uniformly cool a fiber uneven portion and prevent occurrence of structural irregularities.

The fiber bundle used in the present invention may contain at least two types of fibers having different transverse cross-sectional shapes. When such an aspect is adopted, for example, it is possible to obtain an advantage that the protrusion portions and the valley portions just overlap each other to prevent the fibers from excessively adhering to each other like an irregular shape, and a flow path of the liquid to be treated can be secured.

The equivalent circle diameter of the transverse cross-section of the fiber used in the present invention is preferably 10 μm or more and 1000 μm or less. The equivalent circle diameter refers to a diameter when the cross-sectional area of the fiber is converted into a circle. By setting the equivalent circle diameter to 10 μm or more, more preferably 20 μm or more, still more preferably 30 μm or more, and even more preferably 40 μm or more, the breaking strength of the fiber is improved, there is little possibility that the fiber is broken in the spinning step, and fibers excellent in productivity can be obtained. In addition, since it is possible to suppress the occurrence of breakage and cutting of the fibers in a producing process such as a column insertion process after spinning, handleability are also excellent. Furthermore, the volume per surface area is appropriate, and there is no possibility that the adsorption site is saturated and the adsorption performance is rapidly lowered even if the liquid to be treated is allowed to pass for a certain period of time. When the equivalent circle diameter is 1000 μm or less, more preferably 800 μm or less, still more preferably 500 μm or less, and even more preferably 300 μm or less, the cooling efficiency of the fibers discharged in the spinning step can be improved, the shape of the fibers can be easily maintained, and the modification degree as designed can be easily maintained. Maintaining a modification degree is desirable for the development of a preferred adsorption performance.

When the fiber in the present invention is used for medical use, it is preferable that the fiber can adsorb cytokine, β2-microglobulin (β2-MG), low-density lipoprotein, very-low-density lipoprotein, apolipoprotein, or the like, as a pathogenic protein. Representative inflammatory cytokines include tumor necrosis factor alpha (TNFα) and the like. TNFα is a protein related to autoimmunity, and is preferably removed from the blood for the reason that the blood concentration increases due to rheumatism or the like and inflammation, pain or the like is caused. The TNFα adsorption performance of the fiber in the present invention is preferably 1 μg/cm$^3$ or more, more preferably 15 μg/cm$^3$ or more, still more preferably 30 μg/cm$^3$ or more, even more preferably 55 μg/cm$^3$ or more, and even still more preferably 80 μg/cm$^3$ or more.

On the other hand, the fiber in the present invention preferably has a low adsorption amount with respect to a useful protein such as an immunoglobulin or a complement. In particular, IgG that plays a major role in immunity is preferably not excessively adsorbed. When the adsorption amount of IgG is too large, there is a tendency that the immunogenicity of the subject is lowered when the column is used as a purification column. Therefore, the adsorption performance of IgG of the fiber in the present invention is preferably 13 mg/cm$^3$ or less, more preferably 9 mg/cm$^3$ or less, still more preferably 6 mg/cm$^3$ or less, and even more preferably 3 mg/cm$^3$ or less.

<Fiber Bundle>

The fiber bundle in the present invention preferably includes a multifilament in which at least a plurality of fibers as described above and at least two or more fibers are bundled. Here, the number of fibers contained in the fiber bundle is appropriately selected from a shape, a filling rate, a fiber diameter, and ease of arrangement of the tubular case. Within an appropriate range, fracture and meandering due to breakage and bending of fibers and contact between fibers can be prevented in the producing processes after insertion into the tubular case. If the number of fibers is too large, it is difficult to insert the fiber bundle into the tubular case, and the flow of the liquid to be treated at the time of actual use is deteriorated, which is not preferable.

In the multifilament, a plurality of fibers may be twisted, but it is preferable not to twist the multifilament because a portion where the fibers adhere to each other by twisting the multifilament is less likely to come into contact with the liquid to be treated, and a fiber surface that does not contribute to adsorption is likely to be generated.

In the fiber bundle used in the present invention, it is important that the linear rate represented by (length of fiber bundle)/(length of one fiber) is 0.97 or more and 1.00 or less (requirements (E) and (iv)). By setting the linear rate of the fiber bundle to 0.97 or more, preferably 0.975 or more, more preferably 0.98 or more, and still more preferably 0.99 or more, it is possible to reduce the situation in which the fibers are arranged in the fiber bundle with an inclination with respect to the longitudinal direction of the fiber bundle, to suppress the pressure loss when the fiber bundle is formed into a column and the collision of blood cells with the fiber surface, and to improve the blood reinfusion property. The upper limit of the linear rate is 1.00 when the length of the fiber bundle is equal to the length of one fiber.

Here, the "length of the fiber bundle" in the definition of the linear rate refers to a length from one end to the other end of the fiber bundle. The "length of the fiber bundle" in the present invention can be obtained by measuring, with a vernier caliper, from one end to the other end of the fiber bundle at 10 points while uniformly transferring measurement positions in the circumferential direction of the fiber bundle end face, and calculating the average value.

The "length of one fiber" is a length of one fiber measured in a state where one fiber is taken out from the fiber bundle, and means an average value measured for optionally 100 fibers.

As a problem in the purification column using the fiber bundle, there is adhesion between fibers. When the fibers are in close contact with each other, the liquid to be treated cannot appropriately flow through the gap between the fibers, and problems such as short pass in the column and retention of the liquid to be treated occur.

Hitherto, as the purification column using the fiber bundle, an artificial kidney using a hollow fiber membrane or the like has existed, and for these, a method has been adopted in which adhesion between main fibers is prevented by winding around an outer surface of a fiber mainly including a spacer fiber separately from a fiber having a main function, or adhesion between fibers is prevented by imparting crimp to the fiber itself. It can be said that these methods are suitable when the liquid to be treated needs to flow while being retained to some extent for substance exchange by concentration diffusion inside and outside the hollow fiber membrane, which is a function expected for the hollow fiber membrane.

On the other hand, as in a preferred embodiment of the present invention, in a purification column of a type in which a non-hollow fiber is used and a substance to be adsorbed is removed exclusively by adsorption, it is more important to secure an adsorption area of fibers capable of capturing the substance to be adsorbed.

As described above, as a result of intensive studies by the present inventors on a method for preventing adhesion between fibers and securing an adsorption area without using a method such as crimping of spacer fibers or fibers, the present inventors have found that it is important to secure linearity of each fiber. The fact that this linearity is important is not limited to a theoretical idea, and the importance has been found for the first time by specifically measuring the lengths of the fiber bundle and one fiber.

Furthermore, in order to maintain the present linearity, a greater effect can be expected by making the fiber used in the present invention have a modified cross-section.

As described above, in the purification column in the related art, the linear rate of each fiber is not considered, and it can be said that this is a novel achievement means set by the inventors for the first time in the present invention. Furthermore, the inventors have found for the first time that it is important that the linear rate is 0.97 or more and 1.00 or less by the above measurement method.

<Purification Column>

The fiber bundle in the present invention is used by being housed in a column in which headers are attached to both ends of a tubular case. Here, the housing portion refers to a volume portion defined by the inner space of the tubular case. A part of the fiber bundle may partially extend from an end portion of the housing portion toward a portion defined by the inner space of the header.

In the purification column of the present invention, the fiber bundle is housed in substantially parallel to the longitudinal direction of the tubular case. The term "substantially parallel" preferably means parallel to the longitudinal direction of the tubular case, and the number of fibers having an inclination of 20 degrees or less with respect to the longitudinal direction of the tubular case is preferably 90% or more of the total. Although fibers having an inclination of up to 45 degrees may be included in the outer periphery portion of the fiber bundle to some extent, the number of fibers having an inclination of more than 20 degrees and 45 degrees or less with respect to the longitudinal direction of the tubular case is preferably 10% or less of the total. As the shape in the longitudinal direction of the fiber when incorporated in the column, a straight shape, a crimped shape, a spiral shape, and the like are conceivable, but the straight shape is preferable. The fiber-shaped fiber easily secures a flow path for the liquid to be treated, and thus easily distributes the liquid to be treated evenly in the column. In addition, the flow path resistance can be suppressed, and even when a solute in the liquid to be treated adheres, a rapid increase in pressure loss can be suppressed.

The shape of the case constituting the column is preferably a tubular body having open ends at both ends. Therefore, the fiber bundle is preferably housed in the tubular case. In particular, a tubular body having a perfectly circular transverse cross-section is preferable. This is because the tubular case does not have a corner, so that it is possible to suppress the stagnation of the liquid to be treated at the corner.

The tubular case is preferably made of plastic, metal, or the like. Among them, plastic is suitably used from the viewpoint of cost, moldability, weight, blood compatibility, and the like. In the case of plastic, for example, a thermoplastic resin having excellent mechanical strength and thermal stability is used. Specific examples of such a thermoplastic resin include a polycarbonate-based resin, a cellulose-based resin, a polyester-based resin, a polyarylate-based resin, a polyimide-based resin, a cyclic polysulfone resin, a polyethersulfone resin, a polyolefin-based resin, a polystyrene resin, a polyvinyl alcohol resin, and mixtures thereof. Among them, polypropylene, polystyrene, polycarbonate, and derivatives thereof are preferable in terms of moldability and radiation resistance required for the tubular case. In particular, a resin having excellent transparency, such as polystyrene or polycarbonate, is advantageous for securing safety because, for example, when the liquid to be treated is blood, a state of the inside can be confirmed at the time of perfusion, and a resin having excellent radiation resistance is preferable at the time of radioactive irradiation at the time of sterilization. The resin is processed into a tubular case by injection molding with a mold or cutting a raw material.

The inner diameter of the housing portion in the purification column of the present invention is preferably 32 mm or more and 60 mm or less. In addition, it is important that the inner diameter of the housing portion in the purification column (II) of the present invention is 32 mm or more and 60 mm or less (requirement (iii)). By setting the inner diameter of the housing portion to 32 mm or more, more preferably 34 mm or more, still more preferably 36 mm or more, and even more preferably 38 mm or more, the flow rate per area of the liquid to be treated is reduced, and it is possible to suppress an excessive increase in pressure loss and hemolysis associated therewith. In addition, the tubular case portion can be easily held by the holder at the time of actual use, and it is possible to prevent the tubular case portion from falling due to insufficient holding and from being broken or cracked. In addition, by setting the diameter to 60 mm or less, more preferably 58 mm or less, still more preferably 56 mm or less, even more preferably 55 mm or less, and even still more preferably 54 mm or less, it is possible to prevent generation of fibers in which the flow of the liquid to be treated does not reach the outer periphery portion and is not effectively used.

The length of the housing portion in the purification column is preferably 100 mm or more and 1000 mm or less. Here, the length of the housing portion is a length in an axial direction of the tubular case before the header is mounted. By setting the length to 100 mm or more, more preferably 120 mm or more, still more preferably 140 mm or more, even more preferably 150 mm or more, and even still more preferably 160 mm or more, the handleability can be improved, the insertability of the fiber into the column can be improved, and the handleability at the time of preparing the column can also be improved. On the other hand, by setting the length to 1000 mm or less, more preferably 800 mm or less, still more preferably 600 mm or less, even more preferably 500 mm or less, and even still more preferably 400 mm or less, the handleability in actual use as a purification column can be facilitated.

In the purification column of the present invention, the length of the fiber bundle/the inner diameter (L/D) of the housing portion is preferably 0.5 or more and 2.5 or less. When the L/D is 0.5 or more, more preferably 0.6 or more, still more preferably 0.7 or more, and even more preferably 0.8 or more, a short pass in the outer periphery portion can be suppressed, and the handleability is also excellent. On the other hand, by setting the L/D to 2.5 or less, more preferably 2.0 or less, still more preferably 1.7 or less, and even more preferably 1.4 or less, it is possible to suppress excessive increase in pressure loss, hemolysis, and deterioration of irritation to blood cells.

In the purification column of the present invention, the filling rate of the fibers in the housing portion is preferably 40% or more and 73% or less. In the purification column (II) of the present invention, the filling rate of the fibers in the housing portion is 40% or more and 73% or less (requirement (ii)). By setting the filling rate to 40% or more, more preferably 45% or more, still more preferably 50% or more, and even more preferably 55% or more, the fibers in the tubular case are less likely to be biased, and unevenness in the flow of the liquid to be treated in the purification column can be prevented. In addition, by setting the filling rate to 73% or less, more preferably 71% or less, still more preferably 70% or less, even more preferably 69% or less, and even still more preferably 67% or less, the insertability into the tubular case can be improved.

The filling rate is housing portion capacity (Vc)/fiber volume (Vf) in the housing portion. The housing portion capacity is a volume of the inner space portion of the tubular case calculated from the cross-sectional area of the housing portion and the housing portion length. The fiber volume in the housing portion is calculated from the fiber cross-sectional area, the housing portion length, and the number of fibers. Specifically, it is expressed by the following equation.

$Vc$=cross-sectional area of housing portion×housing length $Vf$=fiber cross-sectional area×length of housing portion×number of fibers Filling rate=$Vf/Vc$×100(%) (Equation)

When the tubular case has a tapered structure in which the diameter increases toward both ends, the cross-sectional area of the housing portion is defined as the cross-sectional area at the center of the tubular case. In addition, when a spacer fiber or the like for preventing adhesion between fibers in the tubular case is used, Vf also includes the volume of the spacer fiber.

In the purification column of the present invention, the volume of the flow path of the liquid to be treated in the housing portion is preferably 5 mL or more and 60 mL or less. In the purification column (II) of the present invention, the volume of the flow path of the liquid to be treated in the housing portion is 5 mL or more and 60 mL or less (requirement (v)). The capacity of the flow path of the liquid to be treated in the housing portion refers to a portion obtained by subtracting the fiber volume in the housing portion of the purification column, and is expressed as follows.

Volume (mL) of flow path of liquid to be treated in housing portion=$Vc-Vf$

The fiber volume can be calculated by multiplying the total cross-sectional area of the fibers calculated according to the method for measuring a fiber diameter described above by the length of the fiber bundle arranged in the housing portion.

By setting the volume of the flow path of the liquid to be treated in the housing portion to 5 mL or more, more preferably 10 mL or more, still more preferably 15 mL or more, and even more preferably 20 mL or more, the substance to be adsorbed can be efficiently removed in a predetermined time. On the other hand, by setting the volume to 60 mL or less, more preferably 55 mL or less, still more preferably 50 mL or less, even more preferably 45 mL or less, and even still more preferably 40 mL or less, it is possible to obtain a purification column which is less likely to cause blood pressure decrease and anemia without taking out a large amount of blood outside the body.

In addition, in the present invention, the volume of the flow path of the liquid to be treated in the entire purification column including the housing portion is preferably 10 mL or more and 70 mL or less. By setting the volume to 10 mL or more, more preferably 15 mL or more, still more preferably 20 mL or more, and even more preferably 25 mL or more, a distance and a space from the inlet port of the liquid to be treated to the housing portion are secured, the liquid to be treated can be prevented from linearly flowing, and the liquid to be treated can be uniformly diffused and passed in the header. On the other hand, by setting the volume to 70 mL or less, more preferably 60 mL or less, still more preferably 50 mL or less, and even more preferably 40 mL or less, the amount of blood to be taken out can be reduced.

In the purification column of the present invention, the equivalent circle diameter of the flow path of the liquid to be treated is preferably 20 μm or more and 100 μm or less. By setting the equivalent circle diameter to 20 μm or more, more preferably 25 μm or more, still more preferably 30 μm or more, and even more preferably 35 μm or more, a flow path of the liquid to be treated can be secured, and an increase in pressure loss during liquid passage can be suppressed. On the other hand, by setting the equivalent circle diameter to 100 μm or less, more preferably 90 μm or less, still more preferably 80 μm or less, and even more preferably 70 μm or less, it is possible to prevent the flow of the liquid to be treated from being biased to a specific flow path and not reaching the entire column, and to efficiently bring the surface of the porous fiber into contact with the liquid to be treated.

Here, the equivalent circle diameter of the flow path of the liquid to be treated can be calculated using the occupancy of the liquid to be treated in a cross-sectional area and an immersion side length. The immersion side length refers to a circumferential length of the liquid to be treated in contact with a solid wall in the flow path.

equivalent circle diameter (μm) of flow path of liquid to be treated=4×occupancy (cm$^2$) of liquid to be treated in cross-sectional area/immersion side length (cm)×10,000

Occupancy (cm$^2$) of liquid to be treated in cross-sectional area=column cross-sectional area−total cross-sectional area of fibers Immersion side length (cm)=inner diameter of case× π+outer periphery length of fiber×number of fibers (Equation)

FIG. 1 illustrates a side view illustrating an embodiment of a purification column according to the present invention. In this embodiment, a purification column 1 includes a fiber bundle as an adsorbent 5 in a column defined by at least a header 2, a distribution plate 3, and a tubular case 4. The header 2 includes ports serving as an inlet and an outlet of the liquid to be treated. In FIG. 1, a cap for sealing a port portion is provided.

The purification column of the present invention can be used in a wide variety of applications, and can be mainly used for separating substances to be adsorbed from various liquids and gases. In particular, in medical applications, it is suitably used for removing pathogenic proteins, bacteria, viruses, endotoxins, sugar chains, autoantibodies, immune complexes, free light chains, potassium, bilirubin, bile acids, creatinine, phosphorus compounds, drugs, and the like from blood, plasma, and body fluids. Examples of pathogenic protein include cytokine, β2-microglobulin (β2-MG), low-density lipoprotein, very-low-density lipoprotein, and apolipoprotein. In addition, when used in water treatment applications, it is suitably used for removing humic substances, metal corrosive substances, and the like.

In the purification column of the present invention, a pressure loss is preferably 1 kPa or more and 20 kPa or less when bovine blood is allowed to flow at a flow rate of 200 mL/min for 1 hour. By setting the pressure loss to 1 kPa or more, more preferably 1.5 kPa or more, still more preferably 2 kPa or more, and even more preferably 2.5 kPa or more, proteins are likely to move into the porous fiber, and the adsorption performance is improved. In addition, by setting the pressure loss to 20 kPa or less, more preferably 10 kPa or less, still more preferably 9 kPa or less, even more preferably 8 kPa or less, and even still more preferably 7 kPa or less, it is possible to prevent the shear stress applied to the blood cells from increasing and causing hemolysis. The pressure loss can be controlled by adjusting the filling rate of the fibers in the column, the inner diameter of the tubular case, the fiber diameter, the number of fibers, and the like. Although a detailed measurement method of the pressure loss will be described later, the pressure loss is calculated using the following equation.

Pressure loss=inlet pressure of circuit with column applied−outlet pressure of circuit with column applied−(inlet pressure of circuit only−outlet pressure of circuit only) (Equation)

In the purification column of the present invention, the increase in hemolysis rate when bovine blood is allowed to flow at a flow rate of 400 mL/min for 4 hours is preferably 1.0 or less. By setting the hemolysis rate to 1.0 or less, more preferably 0.9 or less, still more preferably 0.8 or less, even more preferably 0.7 or less, and even still more preferably 0.6 or less, the risk of hemolysis occurring when blood is taken out from a patient can be suppressed. The increase in hemolysis rate is expressed by the following equation.

Increase in hemolysis rate=hemolysis rate of bovine blood after circulation−hemolysis rate of bovine blood before circulation Although a detailed measurement method of the hemolysis rate will be described later, the hemoglobin (Hb) concentration is measured using a measurement kit or the like, and the hemolysis rate is calculated using the following equation.

Hemolysis rate (%)=hemoglobin concentration in plasma (mg/dL)/total hemoglobin concentration (mg/dL)×100 (Equation)

Examples of the target of adsorption removal of the purification column of the present invention include β2-MG which is a causative protein of dialysis-related amyloidosis which is a dialysis complication. In the purification column of the present invention, the β2-MG clearance when bovine blood is flown at a flow rate of 200 mL/min for 1 hour is preferably 35 mL/min or more and 120 mL/min or less. When the clearance is 35 mL/min or more, more preferably 40 mL/min or more, still more preferably 50 mL/min or more, and even more preferably 60 mL/min or more, a column having sufficient β2-MG adsorption capacity for obtaining an excellent therapeutic effect can be produced. On the other hand, by setting the clearance to 120 mL/min or less, it is possible to suppress adhesion of other blood containing substances. Although a detailed method for measuring the adsorption performance of β2-MG will be described later, the adsorption performance of β2-MG is calculated by measuring the concentration of β2-MG before and after passage to the purification column.

Figure 2:
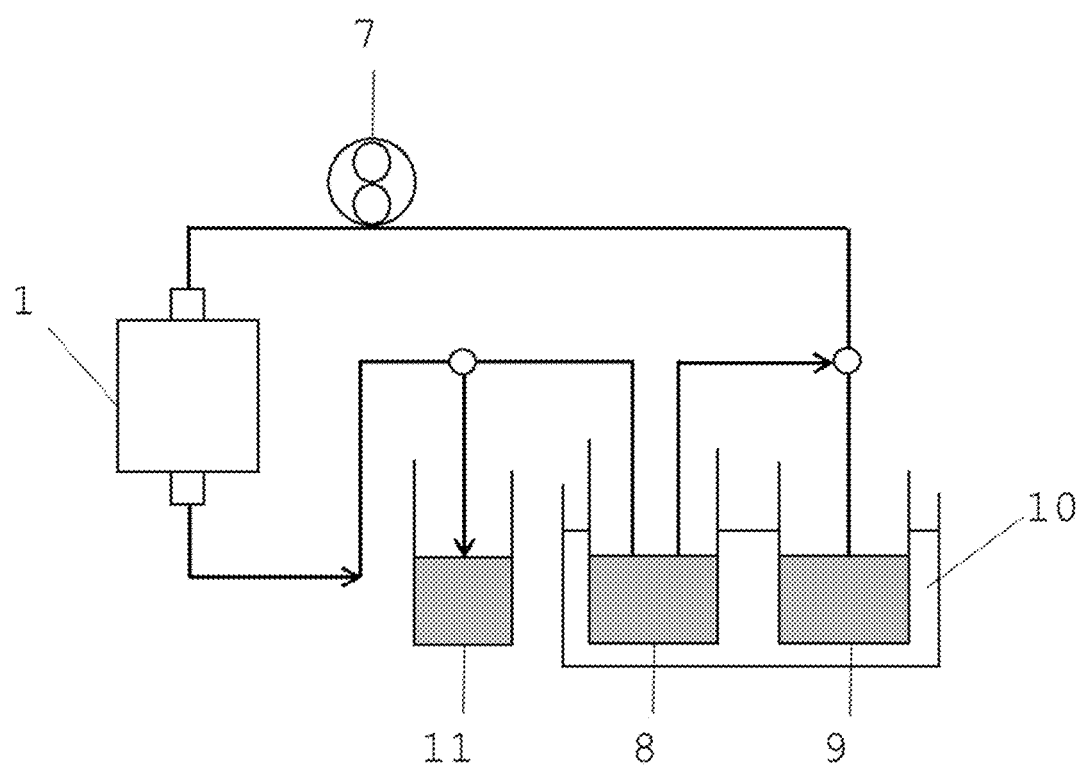
FIG. 2 is a circuit diagram relating to β-MG clearance measurement of the purification column according to the present invention.

FIG. 2 illustrates an example of a circuit diagram relating to β2-MG clearance measurement of the purification column according to the present invention. In this circuit 6, a pump 7 for circulating the liquid to be treated and a purification column 1 are connected to a tube called a blood circuit. As the liquid to be treated, bovine blood for circulation 8 and bovine blood for clearance 9 are provided, and these are immersed in a hot water bath 10 for keeping the temperature constant. A disposal beaker 11 for storing the bovine blood for clearance after passing through the purification column is also provided.

In the purification column of the present invention, it is also preferable that the clearance/housing portion capacity, which is a value obtained by dividing the β2-MG clearance when bovine blood flows at a flow rate of 200 mL/min for 1 hour by the capacity of the flow path of the liquid to be treated in the purification column, is 1.0 or more. Since the clearance/housing portion capacity represents the adsorption performance per amount of blood to be taken out, the higher the value, the higher the therapeutic effect can be exhibited while suppressing the occurrence of anemia at the time of use.

<Production of Fiber Bundle and Purification Column>

In the production of the fiber in the present invention, the viscosity of the spinning solution is preferably 10 poise (1 Pa·sec) or more and 100,000 poise (10,000 Pa·sec) or less. When the viscosity is 10 poise (1 Pa·sec) or more, more preferably 90 poise (9 Pa·sec) or more, still more preferably 400 poise (40 Pa·sec) or more, and even still more preferably 800 poise (80 Pa·sec) or more, the fluidity of the stock solution is moderate, and it is easy to maintain a desired shape. On the other hand, when the viscosity is 100,000 poise (10,000 Pa·sec) or less, and more preferably 50,000 poise (5,000 Pa·sec) or less, the pressure loss at the time of discharge of the solution is not increased, the discharge stability is maintained, and the solution is easily mixed.

The viscosity is measured by a falling ball method in a thermostatic bath set at a spinning temperature according to JIS Z 8803: 2011. Specifically, the fiber diameter is obtained by filling a viscosity tube having an inner diameter of 40 mm with a spinning solution, dropping a steel ball (material: SUS 316) having a diameter of 2 mm into the solution, and measuring the time required for dropping of 50 mm. The temperature at the time of measurement is 92° C.

In the above range, a spinning solution in which a polymer is dissolved in a solvent is prepared. At this time, since the pore size of the fiber can be increased as the concentration of the solution polymer (concentration of the substance excluding the solvent in the solution) is lower, it is possible to control the pore size and the pore amount by appropriately setting the concentration of the solution polymer. From such a viewpoint, the concentration of the solution polymer is preferably 30 mass % or less, more preferably 27 mass % or less, and still more preferably 24 mass % or less.

In addition, it is also possible to control the pore size and the pore amount by using a polymer having a negatively charged group. When, for example, a polymer having methacrylsulfonic acid p-styrenesulfonic acid is used as the negatively charged group, the proportion of the polymer having methacrylsulfonic acid p-styrenesulfonic acid present in all the polymers is preferably 10 mol % or less.

In order to produce fibers having a modified cross-sectional shape as the fibers in the present invention, it is preferable to control the discharge port shape of the spinneret in addition to the composition of the spinning solution and contrivance in a dry zone. For example, it is preferable that the spinneret is constituted by a center circle, a slit, and a circle at the tip of the slit, and a center circle diameter, a slit portion width, a slit portion length, and a tip circle diameter are each appropriately designed. When the spinneret has such a preferable shape, since the cross-sectional area of the spinneret discharge port is moderate, the draft in the dry zone does not become too large, the fiber diameter and the modification degree unevenness called draw resonance hardly occur, and spinning is easy.

The spinning method for obtaining the fiber in the present invention may be either melt spinning or solution spinning. In the melt spinning, the fibers are obtained by passing a solution through a dry air portion at a certain distance using a spinneret, and then discharging the solution to a coagulating bath composed of a poor solvent such as water or a non-solvent.

The production of the porous fiber having a porous structure is not limited to the production method of thermally induced phase separation/non-solvent induced phase separation, but in the non-solvent induced phase separation, the solvent is rapidly removed at the time of immersion in a coagulating bath, and a porous shape is relatively easily obtained, which is preferable. The conditions of the dry-wet zone may be any of a dry type, a wet type, and a dry-wet type, but the dry-wet type is particularly preferable because the porous structure of the fiber surface can be precisely controlled by the dry-wet zone conditions. Although the detailed mechanism is not clear, it is possible to control the degree of irregularity and surface roughness of the surface of the porous fiber by adjusting the cold air temperature and the dew point. For example, by increasing the cooling air speed to increase the cooling efficiency, the surface opening ratio of the fiber and the hole diameter in the vicinity of the fiber outer periphery portion can be increased.

The draft ratio at the time of discharge is preferably 1.5 or more and 30 or less. The draft ratio is a parameter defined as the ratio of the take-up speed of the fibers to the speed of the spinning solution discharged from the spinneret. By setting the draft ratio to 1.5 or more, more preferably 3 or more, or 30 or less, it is possible to stretch under an appropriate tension, and to prevent being blown by cold air or outside air to some extent. In addition, under the spinning conditions in which the dry zone is present, the pores of the fiber are elongated and become oval, so that the surface area per space is smaller than that of spherical pores. With this, it possible to obtain a fiber having both the separation amount and sharpness of separability.

In the melt spinning, the spinning solution discharged from the spinneret is coagulated in a coagulating bath. The coagulating bath generally consists of a mixture with a coagulant such as water or alcohol, or a solvent constituting the spinning solution. Water is generally selected from the viewpoints of ease of wastewater treatment, safety in a living body at the time of production, and the risk of inflammation and leakage. In addition, the pore size can be changed by controlling the temperature of the coagulating bath. Since the pore size is affected by the temperature at the time of the progress of phase separation and the environment around the polymer, the temperature of the coagulating bath is also appropriately selected. In general, the pore size can be increased by increasing the coagulating bath temperature. Although the mechanism is not exactly clear, it is considered that the desolvation is fast in a high-temperature bath due to a competitive reaction between desolvation from the solution and coagulation shrinkage, and the fiber is coagulated and fixed before the inside of the fiber contracts. For example, when the fiber contains PMMA, the coagulating bath temperature is preferably 90° C. or lower, more preferably 75° C. or lower, and particularly preferably 65° C. or lower. When the upper limit of the coagulating bath temperature is in the above preferred range, the pore size does not become excessively large, so that the pore specific surface area does not decrease, the strength and elongation do not decrease, and nonspecific adsorption does not increase. The lower limit of the coagulating bath temperature is preferably 5° C. or higher, and more preferably 20° C. or higher. When the lower limit of the coagulating bath temperature is in the above preferred range, the pore size is not excessively reduced, and the substance to be adsorbed is likely to diffuse into the pores.

The fibers are then washed to remove the solvent adhering to the coagulated fibers. The means for washing the fibers is not particularly limited, but a method of passing the fibers through a multi-stage water bath (referred to as a water washing bath) is preferably used. When the temperature of water in the water washing bath is too low, the washing effect may be insufficient, and when the washing temperature is too high, water may not be used as a washing liquid. In addition, it is preferable to determine depending on the properties of the polymer constituting the fiber. In consideration of the washing efficiency, for example, in the case of a fiber containing PMMA, the temperature is preferably 30° C. or higher and 50° C. or lower. Here, the time for immersion in the water washing bath is also appropriately selected depending on the fiber diameter and the spinning speed. When the washing step is insufficient and the residual amount of the solvent is large, the fiber structure is deteriorated, and the handleability after winding is deteriorated, so that it is preferable to sufficiently wash. When it is necessary to apply a pore-forming agent or a modifier to the fiber to some extent, excessive washing is not preferable.

In addition, in order to maintain the pore size of the pores after the water washing bath, a step of applying a moisturizing component to the fiber may be added. The moisturizing component as used herein refers to a component capable of maintaining the humidity of the fiber or a component capable of preventing a decrease in the humidity of the fiber in the air. Typical examples of the moisturizing component include glycerin and an aqueous solution thereof.

After completion of water washing and imparting of the moisturizing component, in order to enhance the dimensional stability of the highly shrinkable fiber, it is also possible to pass through a step of a bath filled with an aqueous solution of the heated moisturizing component (referred to as a heat treatment bath). The heat treatment bath is filled with an aqueous solution of a heated moisturizing component, and when the fiber passes through the heat treatment bath, the fiber undergoes a thermal action to be shrunk, and is less likely to be shrunk in the subsequent steps, so that the fiber structure can be stabilized. If the fiber structure is not stabilized, the fiber causes anisotropic shrinkage between the time of production and the time of actual use, and the fiber is in a different arrangement state from the time of production, so that flow unevenness occurs and adsorption performance is deteriorated, which is not preferable. The heat treatment temperature at this time varies depending on the fiber material, but in the case of a fiber containing PMMA, the heat treatment temperature is set to preferably 50° C. or higher, more preferably 80° C. or higher, still more preferably 95° C. or higher, and even more preferably 97° C. or higher.

Thereafter, it is preferable that the fiber is introduced into a winding portion via a tension control mechanism such as a dancer roll, and thereby the fiber is smoothly wound while maintaining a constant tension. The tension control mechanism is not limited to the dancer roll, and may be a mechanism that fluctuates and relaxes tension applied to the fiber, such as two or more drive rolls and rolls having irregularities in the circumferential direction.

In the method for producing a fiber bundle of the present invention, it is important to set the tension at the time of winding to 0.5 g/fiber bundle or more and 10.0 g/fiber bundle or less (requirement (a)). By setting the tension to 0.5 g/fiber or more, more preferably 0.9 g/fiber or more, still more preferably 1.0 g/fiber or more, even more preferably 1.3 g/fiber or more, even still more preferably 1.5 g/fiber or more, and further still more preferably 1.7 g/fiber or more, the fiber can be prevented from expanding and meandering during winding. The brittle fracture of the fibers contained in the fiber bundle can be prevented by setting the tension to 10.0 g/fiber or less, more preferably 8.0 g/fiber or less, still more preferably 5.0 g/fiber or less, and even more preferably 3.0 g/fiber or less. When the fiber is plastically deformed, the fiber does not return to the original length even after being released from the tension. Therefore, in a fiber having a small elastically deformed region, it is preferable that the tension is applied within the above range. In addition, by winding up the fibers in an appropriate number, it is possible to prevent deformation while aligning the fibers (a plurality of fibers are referred to as tows). In this way, by dispersing the tension in a plurality of fibers, a preferable effect within the above range can be stably obtained without concentration of force on one fiber. In the purification column of the present invention, since the linearity of the fibers in the fiber bundle cannot be enhanced in the step after winding, it is extremely important to apply tension before winding.

For winding, a spool (reel) is used because meandering of the fiber can be suppressed. As the spool to be used, various shapes can be adopted, but a polygonal shape is preferable.

Before the fiber is wound around the spool, the fiber bundle is reciprocated at a predetermined speed in a direction perpendicular to the spool axis through a traverse mechanism to uniformly wind the fiber bundle without irregularities. Here, if the method is a method of uniformly winding the fiber bundle without irregularities, in the traverse mechanism, the fiber may be moved with respect to the spool by a guide or a roller, or the spool itself may be moved in parallel.

In the method for producing a fiber bundle of the present invention, it is important to set the traverse movement distance (a distance of parallel movement in a vertical direction from an advancing direction of the fiber) to 0.1 mm or more and 30 mm or less in a time during which the spool makes one rotation (requirement (b)). When the distance is 0.1 mm or more, more preferably 0.5 mm or more, still more preferably 1.0 mm or more, and even more preferably 1.3 mm or more, it is possible to prevent the occurrence of density in the arrangement of fibers in the fiber bundle and to obtain a fiber bundle having a shape close to a perfect circle. When the distance is 30 mm or less, more preferably 25.0 mm or less, still more preferably 20.0 mm or less, even more preferably 15.0 mm or less, and even still more preferably 10.0 mm or less, the force applied to the fiber when the moving direction of the traverse is switched can be reduced, the breakage, fracture, and derailment from the traverse roller of the fiber can also be reduced, and further, the fiber can be prevented from meandering in the fiber bundle to complicate the flow path of the liquid to be treated.

When a plurality of fibers are wound together, it is preferable to set the traverse movement distance to such an extent that the tows are not stacked after one rotation and are in lateral contact without a gap. The traverse movement distance when the spool rotates one round may be a constant value as long as it is within the above range, or may be changed during winding.

The traverse stroke is preferably changed during winding so as to match the final fiber bundle shape. The traverse stroke is a maximum distance in which the traverse roller moves in a direction perpendicular to the spool axis, and the fiber repeats reciprocating motion in the stroke through the traverse mechanism. When the fiber bundles used in the purification column of the present invention are bundled, the average value of the traverse stroke preferably satisfies the relationship of middle stage>end stage=initial stage at the initial stage, middle stage, and end stage of winding with traversing (requirement (c)). Here, "=" means equal at a level of 1 mm, and the relationship between the sizes means that there is a difference of 1 mm or more. By setting the relationship as described above, a fiber bundle having a shape in which the transverse cross-section is close to a perfect circle can be obtained by being small at the initial stage, being large at the middle stage of forming the central portion of the fiber bundle, and being small again at the end stage, and being equal to the initial stage.

In addition, a program may be set so as to continuously change the traverse during the winding, but as a result of intensive studies, it has been found that the traverse stroke is preferably discontinuously changed. Specifically, the number of changes of the traverse stroke is preferably any one of 4, 6, 8, 10, and 12 (requirement (d)). As described above, in order to maximize the traverse stroke at the middle stage of winding the fiber, the traverse stroke needs to be changed an even number of times. Here, the initial traverse stage is a period until the (number of changes of traverse stroke/2−1)-th change is made, the middle stage is a period from the (number of changes of traverse stroke/2−1)-th change to the (number of changes of traverse stroke/2+1)-th change is made, and the end stage is a period after the (number of changes of traverse stroke/2+1)-th change is completed. By changing the traverse stroke stepwise, it is possible to suppress the tow from slipping and the fiber from meandering in the obtained fiber bundle at a point where the moving direction of the traverse is switched (constituting an outer periphery portion of the fiber bundle when being formed).

The number of changes of the traverse stroke is preferably 4 times or more and 12 times or less. By setting the number of changes to four or more, the transverse cross-section of the obtained fiber bundle can have a shape close to a perfect circle. In addition, by setting the number of changes to 12 times or less, in addition to the above-described slip/meandering suppression effect, the present invention can be implemented by a simple program, and can be relatively easily produced.

Thereafter, the fiber bundle is cut out from the spool and inserted into the tubular case. As a method of fixing the fiber bundle end portion in the tubular case, there are a method of disposing a mesh and a method of fixing the fiber bundle end portion with a resin to communicate a partition wall, and providing a hole penetrating the inside and outside of the tubular case. Here, a penetrating hole is an opening communicating with the longitudinal direction of the fiber of the partition wall. In order to form the penetrating hole, there is a method in which a small pin-shaped tube is inserted into a fiber bundle end face portion, and then a resin is caused to flow to the vicinity of an end face portion to perform potting. After the resin is solidified, both ends are cut with a cutter or the like to remove a portion where the fiber is blocked with the resin, and the pin-shaped cylinder is removed, so that an opening of the penetrating hole is formed at a pot layer end portion. However, as compared with a case of using a distribution plate to be described later, in addition to complication of the process, stagnation and turbulent flow of the liquid to be treated generally occur, and it may be difficult to control the flowability into the purification column. On the other hand, the method of disposing the mesh is more preferable because the step is easier than the method of forming a partition wall, and the dispersibility of the liquid in the purification column is high.

In addition, for the purpose of further improving the dispersibility of the liquid to be treated in the purification column, a plate or the like for controlling the flow, which is called a distribution plate, may be provided. The distribution plate has a structure in which a convex portion is inserted into the fiber bundle and an opening structure partitioned with respect to the flow direction. In the purification column according to the present invention, it is preferable that a distribution plate is disposed on at least one end face side, a plurality of openings through which the liquid to be treated can communicate, a support, and a convex portion extending from the support toward the fiber side are provided, and at least a part of the convex portion is inserted into the fiber bundle. By appropriately adjusting an insertion angle, a depth, an opening area, and a partition shape of the convex portion, it is possible to control the flow path resistance with respect to the flow direction so as to incline from the portion where the flow is originally easy toward the portion where the flow is difficult. As a result, the flow of the liquid to be treated can be made uniform, and retention can be suppressed.

As described above, the purification column can be obtained by attaching the header and the mesh to both ends of the tubular case.

EXAMPLES

An example of an embodiment of the present invention will be described in the following examples.
[Measurement Method]
(1) Surface Opening Ratio of Fiber Fibers to be evaluated were fixed on a substrate with a double-sided tape. The morphology was observed in a wet state with an atomic force microscope SPI 3800 (manufactured by Seiko Instruments Inc.). An observation mode was a DMF mode, an observation field was 3 μm×3 μm, and a total of 10 fields were measured. The pixel setting for observation was performed with 512×512 pixels or more. The obtained AFM image was analyzed using software attached to AFM manufactured by Seiko Instruments Inc. The image was binarized by an "automatic threshold selection method based on discrimination and a least square standard" (Nobuyuki Otsu, Journal of The Institute of Electronics, Communication Engineers, 63, pp. 349 to 356 (1980)) to extract irregularity information of the film surface. After the binarization, an area ratio of a black portion of a binarized component was calculated as a surface opening ratio by image analysis.
(2) Dry Ra Value The fiber was sufficiently moistened and then immersed in liquid nitrogen, and moisture in the pores was instantaneously frozen in the liquid nitrogen. Thereafter, the frozen moisture was removed in a vacuum dryer at 0.1 torr (13.3 Pa) or less to obtain a dried sample. The dried sample was cut to about 5 mm and fixed to a silicon wafer with a double-sided tape. The morphology was observed in a dry state by a scanning probe microscope (NanoScope V Dimension Icon manufactured by Bruker). In the measurement of the contact surface, measurement was performed excluding the surface opening. The measurement was performed under the condition that the observation mode was PeakForce Tapping, the cantilever was a SiN cantilever, and the observation field of view was 3 μm×3 μm. A probe was scanned so that the vicinity of the apex of the fixed porous fiber was substantially perpendicular to the longitudinal direction of the fiber. Three fibers to be measured were optionally selected for one fiber to be measured, and one site was observed for each fiber. The dry Ra value of the fiber was calculated by the arithmetic average of the measured values.

(3) Wet Ra Value

The fiber was cut to about 5 mm and fixed to a silicon wafer with a double-sided tape. The morphology was observed in a wet state by a scanning probe microscope (NanoScope V Dimension FastScan Bio manufactured by Bruker). Three fibers to be measured were optionally selected for one fiber to be measured, and one site was observed for each fiber. The wet Ra value of the fiber was calculated by the arithmetic average of the measured values.
(4) Modification Degree Both ends of the fiber to be measured were fixed in a state where a tension of 0.1 g/mm$^2$ was applied, and cut at random positions. The cut surface was enlarged and photographed with an optical microscope (DIGITAL MICROSCOPE DG-2 manufactured by Scala, Inc.). At the time of photographing, a scale was also photographed at the same magnification ratio. After digitizing the image, a diameter Do of a circumscribed circle and a diameter Di of an inscribed circle of the transverse cross-section of the fiber were measured using image analysis software (Scala, Inc., "Micro Measure" ver. 1.04). Then, the modification degree of each fiber was determined by the following equation.

$$\text{Modification degree} = Do/Di$$

This measurement was performed at 30 points, and the values were averaged and rounded off to three places of decimals to obtain the modification degree.
(5) Equivalent Circle Diameter Both ends of the fiber to be measured were fixed in a state where a tension of 0.01 g to 0.10 g/mm$^2$ was applied, and cut. The cut surface was enlarged and photographed with an optical microscope. At that time, a scale was also photographed at the same magnification ratio. After digitizing the image, the outer periphery portion of the transverse cross-section of the fiber was plotted using image analysis software (Scala, Inc., "Micro Measure" ver. 1.04), the points were connected on the software, a cross-sectional area S was calculated, and the equivalent circle diameter of each aperture was calculated by the following equation.

$$\text{Equivalent circle diameter of transverse cross-section of fiber} = 2 \times (S/2\pi)$$

The average of the measured values at 30 points was calculated and rounded off to one decimal place.
(6) Length of One Fiber One end of one fiber was fixed with a tape or the like and vertically lowered, a weight of 10 g per cross-sectional area (mm$^2$) of the fiber was applied to the other end, and the total length when the fiber became linear was quickly measured. This measurement was performed on optionally selected 100 fibers, and the average value thereof was calculated. For example, when the length of one fiber actually used in the measurement in 1 is obtained as a numerical value shorter by 1 mm or more than the "length of fiber bundle", which is the average value of optional 10 points, it is considered that one fiber has been cut in the fiber bundle or the fiber end portion has been damaged and shortened after the producing process. Therefore, the data is not included in the population of 100 fibers, and another fiber sample is selected and subjected to measurement.
(7) TNFα and IgG Adsorption Performance A commercially available human recombinant TNFα (available from R&D) was added to a commercially available human serum (available from Cosmo Bio Co., Ltd.) so as to have a concentration of 1 μg/mL to adjust a TNFα-added human serum. 6 mL of the TNFα-added human serum was placed in a 15 mL centrifuge tube (available from Greiner Bio-One International GmbH), 0.0142 cm³ of fibers were added thereto, and the mixture was shaken left and right at a shaking speed of 30±1 reciprocation/min at 37° C. for 4 hours. The serum before and after shaking was collected, and the concentration of TNFα was quantified by an ELISA method and the concentration of IgG was quantified by an immunoturbidimetry. Each adsorption performance was calculated from the following equation.

Adsorption performance of TNFα (μg/cm³)=(C1−C2)×6/0.0142

Adsorption performance of IgG (mg/cm³)=(C3−C4)×6/0.0142

Here,
C1: Concentration of TNFα before shaking (μg/mL)
C2: Concentration of TNFα after shaking (μg/mL)
C3: Concentration of IgG before shaking (mg/mL)
C4: Concentration of IgG after shaking (mg/mL).

(8) β2-MG Clearance of Purification Column

The bovine blood to which disodium ethylenediaminetetraacetate was added was adjusted so that the hematocrit was 30±3% and the total amount of protein was 6.5±0.5 g/dL. Bovine blood within 5 days after blood collection was used. The bovine blood was divided into 1.2 L for circulation and 1.2 L for clearance measurement. Next, the divided bovine blood was added to the bovine blood for clearance measurement so that the concentration of β2-MG was 1 mg/L, and the mixture was stirred.

A blood circuit and a pump were set so that bovine blood can circulate, and a purification column was connected. A blood circuit inlet was placed in a circulation beaker containing 1.2 L (37° C.) of bovine blood adjusted as described above, and the pump was started at a flow rate of 200 mL/min. The bovine blood discharged from a blood circuit outlet was discarded for 90 seconds. Immediately after that, the blood circuit outlet was inserted into a circulation beaker to achieve a circulation state. The pump was stopped after circulation for 1 hour. Next, the blood circuit inlet was placed in the bovine blood for clearance measurement adjusted above, and the blood circuit outlet was placed in a disposal beaker. At a flow rate of 200 mL/min, after a lapse of 4 minutes from the start of the pump, 10 mL of bovine blood (37° C.) for clearance measurement was collected to prepare a Bi solution. After a lapse of 4 minutes and 50 seconds from the start, 10 mL of the sample flowing from the blood circuit outlet was collected as a Bo solution. Thereafter, the Bi solution and the Bo solution were centrifuged, and bovine plasma in the supernatant portion was collected. These samples were stored in a freezer at −20° C. or lower.

The clearance was calculated from the concentration of β2-MG in each liquid using the following equation.

$$CL \text{ (mL/min)}=QB \times (CBi-CBo)/CBi \times (100-Ht)/100 \quad (I)$$

Here,
CL: β2-MG clearance (mL/min)
QB: Pump flow rate (mL/min)
CBi: β2-MG concentration in Bi solution (μg/L)
CBo: β2-MG concentration in Bo solution (μg/L)
Ht: Hematocrit value (%) of bovine blood for clearance measurement.

(9) Pressure Loss

In the β2-MG clearance measurement of (8) above, the pressure difference between the inlet (Bi) and the outlet (Bo) was measured 4 minutes after passing of the bovine blood for clearance measurement. Further, the pressure difference between Bi and Bo was measured only in the circuit under the same conditions without connecting the purification column. The pressure loss was calculated by the following equation.

Pressure loss=Bi when connecting column−Bo when connecting column (Bi when connecting only circuit−Bo when connecting only circuit)  (Equation)

(10) Hemolysis Rate

The bovine blood prepared in the same manner as in (8) above and a blood circuit set in the same manner were used. 5 mL of bovine blood was collected at the start of circulation. Thereafter, 1 L of bovine blood was circulated at a flow rate of 400 mL/min for 4 hours. After 4 hours of circulation, 3 mL of a circulation liquid was collected. 3 mL of the bovine blood at the start of circulation and the bovine blood 4 hours after circulation were centrifuged, and then a supernatant was collected. For the obtained plasma, the hemoglobin concentration was quantified using a measurement kit (Hemoglobin B-Test Wako, available from FUJIFILM Wako Pure Chemical Corporation). The total hemoglobin concentration of the bovine blood collected at the start was also measured using the same measurement kit, and the hemolysis rate was calculated from the following equation.

Hemolysis rate (%)=hemoglobin concentration in plasma (mg/dL)/total hemoglobin concentration (mg/dL)×100

Furthermore, the increase in hemolysis rate was calculated using the following equation.

Increase in hemolysis rate=hemolysis rate of bovine blood after circulation−hemolysis rate of bovine blood before circulation  (Equation)

Example 1

(Preparation of Fiber Bundle of PMMA)

31.7 parts by mass of syndiotactic PMMA having a mass average molecular weight of 400,000 (hereinafter, syn-PMMA), 31.7 parts by mass of syn-PMMA having a mass average molecular weight of 1,400,000, 16.7 parts by mass of isotactic PMMA having a mass average molecular weight of 500,000 (hereinafter, iso-PMMA), and 20 parts by mass of a PMMA copolymer having a molecular weight of 300,000 and containing 1.5 mol % of sodium p-styrenesulfonate were mixed with 376 parts by mass of dimethyl sulfoxide, and the mixture was stirred at 110° C. for 8 hours to prepare a spinning solution. The viscosity of the obtained spinning solution at 92° C. was 1,880 poise (188 Pa·s). The obtained spinning solution was discharged from two types of spinnerets having discharge holes of different modified shapes at a rate of 1.1 g/min, and the spinning solution was caused to travel 380 mm in a dry zone, then led to a coagulating bath, and passed through the bath. The temperature of the atmosphere in the dry zone was 15° C., and cold air having a dew point of 12° C. was perpendicularly applied to the fiber. Water was used as a coagulating bath, and the water temperature (coagulating bath temperature) was 42.5° C. Each fiber was washed with water and then guided to a bath composed of an aqueous solution containing 70 mass % of glycerin as a moisturizing agent. Thereafter, the fiber was passed through a heat treatment bath at a temperature of 84° C. to relax residual stress. Thereafter, excess glycerin was removed with a scraper, and the fiber was wound up at 45 m/min with a spool. The tension at the time of winding and the traverse movement distance per round were carried out under the conditions shown in Table 1. The number of traverse stroke changes was set to six. In this way, a fiber bundle containing porous fibers having two types of modified cross-sectional shapes and having the number of fibers of 136,000 was obtained.

In the porous fiber, the average pore radius was within a range of 2.5 to 22 nm, the average pore size in the adjacent surface part/average pore size in the center portion part was within a range of 0.85 to 1.50, and the opening ratio of the opening of the fiber surface was within a range of 2 to 15%.
(Preparation of Purification Column)

A purification column was prepared using the obtained fiber bundle. The fiber bundle was inserted into a tubular case having a length of the housing portion of 42 mm and an inner diameter of the housing portion of 52 mm, an excess was cut while leaving a part of the fiber bundle protruding from the tubular case, and the fiber bundle was housed substantially parallel to the longitudinal direction of the tubular case. Further, a distribution plate and a mesh header were attached to both ends of the tubular case to form a column. As the distribution plate, one having a double annular convex portion and having a shape equally distributed to nine sections in a circumferential shape was used. The area ratio of the flow cross section excluding the support columns of the distribution plate was about 60%. Glycerin remaining in the porous fiber after column formation was washed with water, and the inside of the column was filled with water, and then irradiated with a γ-ray of 25 kGy to be sterilized.

Example 2

A purification column was prepared in the same manner as in Example 1 except that the discharge amount of the spinning solution was changed to 1.2 g/min to set the equivalent circle diameter of the fiber to 117 μm. In the porous fiber, the average pore radius was within a range of 2.5 to 22 nm, the average pore size in the adjacent surface part/average pore size in the center portion part was within a range of 0.85 to 1.50, and the opening ratio of the opening of the fiber surface was within a range of 2 to 15%. The obtained evaluation results are shown in Table 1.

Example 3

A purification column was prepared in the same manner as in Example 1 except that the discharge amount of the spinning solution was changed to 1.0 g/min to change the equivalent circle diameter of the fiber to 110 μm, the number of fibers in the fiber bundle to 83,000, the housing length of the tubular case to 55 mm, and the inner diameter of the housing portion to 41 mm. In the porous fiber, the average pore radius was within a range of 2.5 to 22 nm, the average pore size in the adjacent surface part/average pore size in the center portion part was within a range of 0.85 to 1.50, and the opening ratio of the opening of the fiber surface was within a range of 2 to 15%. The obtained evaluation results are shown in Table 1.

Example 4

A purification column was prepared in the same manner as in Example 1 except that the tension at the time of winding was changed to 1.8 gf/yarn and the traverse movement distance per spool rotation was changed to 1.3 mm. In the porous fiber, the average pore radius was within a range of 2.5 to 22 nm, the average pore size in the adjacent surface part/average pore size in the center portion part was within a range of 0.85 to 1.50, and the opening ratio of the opening of the fiber surface was within a range of 2 to 15%. The obtained evaluation results are shown in Table 1.

Comparative Example 1

A purification column was prepared in the same manner as in Example 1 except that the number of fibers in the fiber bundle was changed to 80,000. The obtained evaluation results are shown in Table 1.

Comparative Example 2

A purification column was prepared in the same manner as in Example 1 except that the number of fibers in the fiber bundle was changed to 165,000. The obtained evaluation results are shown in Table 1.

Comparative Example 3

A purification column was prepared in the same manner as in Example 1 except that the number of fibers in the fiber bundle was changed to 45,000, the housing length of the tubular case was changed to 80 mm, and the inner diameter of the housing portion was changed to 30 mm. The obtained evaluation results are shown in Table 1.

Comparative Example 4

A purification column was prepared in the same manner as in Example 1 except that the number of fibers in the fiber bundle was changed to 240,000, the housing length of the tubular case was changed to 25 mm, and the inner diameter of the housing portion was changed to 70 mm. The obtained evaluation results are shown in Table 1.

Comparative Example 5

A purification column was prepared in the same manner as in Example 1 except that a wound fiber bundle was used without applying tension at the time of winding with a spool. The obtained evaluation results are shown in Table 1.

Comparative Example 6

A purification column was prepared in the same manner as in Example 1 except that a wound fiber bundle was used without using the traverse mechanism at the time of winding by a spool. The obtained evaluation results are shown in Table 1.

Comparative Example 7

In the production of a fiber bundle, 16 parts by mass of polysulfone (Udel Polysulfone (registered trademark) P-3500 available from Solvay S.A.) was mixed with 84 parts by mass of N,N-dimethylacetamide (DMAc), and the mixture was stirred at 60° C. for 8 hours to prepare a spinning solution. The obtained spinning solution was discharged from a spinneret having a cylindrical shape, and the spinning solution was caused to travel 350 mm in a dry zone, then led to a coagulating bath, and passed through the bath. As a dry zone atmosphere, cold air having a temperature of 30° C. and a humidity of 80% was perpendicularly applied to the porous fiber. Water was used as a coagulating bath, and the water temperature (coagulating bath temperature) was 40.0°

C. Each porous fiber was washed with water and then wound at 30 m/min with a spool. The obtained evaluation results are shown in Table 1.

Comparative Example 8

A purification column was prepared in the same manner as in Example 1 except that the temperature of the atmosphere in the dry zone in spinning was changed to 1° C., and a dew point of the cold air was changed to −20° C. The obtained evaluation results are shown in Table 1.

Comparative Example 9

A purification column was prepared in the same manner as in Example 1 except that the temperature of the atmosphere in the dry zone in spinning was changed to 25° C., and a dew point of the cold air was changed to 20° C. The obtained evaluation results are shown in Table 1.

TABLE 1-1

| Measurement item | Unit | Example 1 | Example 2 | Example 3 | Example 4 | Comparative Example 1 | Comparative Example 2 | Comparative Example 3 | Comparative Example 4 |
|---|---|---|---|---|---|---|---|---|---|
| dry Ra value | nm | 17 | 14 | 19 | 17 | 17 | 15 | 18 | 18 |
| wet Ra value | nm | 20 | 16 | 21 | 19 | 20 | 16 | 19 | 21 |
| wet Ra/dry Ra | — | 1.19 | 1.08 | 1.12 | 1.13 | 1.19 | 1.07 | 1.08 | 1.12 |
| Linear rate | — | 0.999 | 0.995 | 0.992 | 0.978 | 0.991 | 0.992 | 0.990 | 0.997 |
| Length of one porous fiber | mm | 53.02 | 53.87 | 65.44 | 54.82 | 53.43 | 54.01 | 92.92 | 37.11 |
| Length of fiber bundle | mm | 52.98 | 53.60 | 65.01 | 53.64 | 52.96 | 53.58 | 92.03 | 37.01 |
| Equivalent circle diameter | μm | 114 | 117 | 110 | 113 | 114 | 111 | 112 | 112 |
| Modification degree | — | 2.1 | 2.1 | 2.1 | 2.1 | 2.1 | 2.1 | 2.1 | 2.1 |
| Fiber filling rate | % | 62 | 65 | 60 | 62 | 38 | 74 | 63 | 61 |
| Housing portion inner diameter | mm | 52 | 52 | 41 | 52 | 52 | 52 | 30 | 70 |
| Linear rate | — | 0.999 | 0.995 | 0.992 | 0.978 | 0.991 | 0.992 | 0.990 | 0.997 |
| Volume of flow path of liquid to be treated | mL | 34 | 31 | 23 | 34 | 56 | 23 | 21 | 37 |
| Equivalent circle diameter of flow path of liquid to be treated | μm | 50 | 50 | 58 | 54 | 146 | 30 | 52 | 55 |
| Length of fiber bundle/ Diameter of housing portion (L/D) | — | 1.0 | 1.0 | 1.6 | 1.0 | 1.0 | 1.0 | 3.1 | 0.5 |
| Tension | gf/number | 2.7 | 2.7 | 2.7 | 1.8 | 2.7 | 2.7 | 2.7 | 2.7 |
| Traverse movement distance | mm | 1.6 | 1.6 | 1.6 | 1.3 | 1.6 | 1.6 | 1.6 | 1.6 |
| Average value of traverse stroke (initial stage) | mm | 25 | 25 | 21 | 25 | 25 | 25 | 14 | 42 |
| Average value of traverse stroke (middle stage) | mm | 50 | 50 | 40 | 50 | 50 | 50 | 28 | 66 |
| Average value of traverse stroke (end stage) | mm | 25 | 25 | 21 | 25 | 25 | 25 | 14 | 42 |
| Number of changes in traverse stroke | Times | 4 | 4 | 4 | 4 | 4 | 4 | 4 | 6 |
| IgG adsorption amount | mg/cm$^3$ | 1 | 4 | 3 | | | | | |
| TNFα adsorption amount | μg/cm$^3$ | 104 | 86 | 110 | | | | | |
| Pressure loss | kPa | 4 | 4 | 7 | 15 | 0.4 | 21 | 30 | 2 |
| Increase in hemolysis rate | — | 0.2 | 0.0 | 0.1 | 0.8 | 0.1 | 1.3 | 3.3 | 0.2 |
| Clearance | mL/min | 48 | 43 | 37 | 46 | 16 | 55 | 49 | 26 |

TABLE 1-2

| Measurement item | Unit | Example 8 | Comparative Example 5 | Comparative Example 6 | Comparative Example 7 | Comparative Example 8 | Comparative Example 9 |
|---|---|---|---|---|---|---|---|
| dry Ra value | nm | 18 | 15 | 18 | 15 | 8 | 35 |
| wet Ra value | nm | 20 | 18 | 20 | 15 | 9 | 42 |
| wet Ra/dry Ra | — | 1.14 | 1.17 | 1.08 | 1.00 | 1.13 | 1.20 |
| Linear rate | — | 0.955 | 0.961 | 0.956 | | 0.984 | 0.983 |
| Length of one porous fiber | mm | 70.15 | 55.80 | 55.86 | | 53.76 | 53.89 |
| Length of fiber bundle | mm | 67.00 | 53.60 | 53.43 | | 52.89 | 52.99 |
| Equivalent circle diameter | μm | 110 | 115 | 115 | 115 | 113 | 114 |
| Modification degree | — | 2.1 | 2.1 | 2.1 | 1.0 | 2.1 | 2.1 |
| Fiber filling rate | % | 60 | 69 | 69 | | 63 | 64 |
| Housing portion inner diameter | mm | 65 | 52 | 52 | | 52 | 52 |
| Linear rate | — | 0.955 | 0.961 | 0.956 | | 0.984 | 0.983 |
| Volume of flow path of liquid to be treated | mL | 74 | 28 | 28 | | 34 | 34 |
| Equivalent circle diameter of flow path of liquid to be treated | μm | 57 | 41 | 41 | | 52 | 50 |
| Length of fiber bundle/ Diameter of housing portion (L/D) | — | 1.0 | 1.0 | 1.0 | | 1.0 | 1.0 |

TABLE 1-2-continued

| Measurement item | Unit | Example 8 | Comparative Example 5 | Comparative Example 6 | Comparative Example 7 | Comparative Example 8 | Comparative Example 9 |
|---|---|---|---|---|---|---|---|
| Tension | gf/number | 2.7 | 0.0 | 2.7 | | 2.7 | 2.7 |
| Traverse movement distance | mm | 1.6 | 1.6 | 0.0 | | 1.6 | 1.6 |
| Average value of traverse stroke (initial stage) | mm | 40 | 25 | | | 25 | 25 |
| Average value of traverse stroke (middle stage) | mm | 60 | 50 | | | 50 | 50 |
| Average value of traverse stroke (end stage) | mm | 40 | 25 | | | 25 | 25 |
| Number of changes in traverse stroke | Times | 6 | 4 | | | 4 | 4 |
| IgG adsorption amount | mg/cm$^3$ | | | | 14 | 1 | 17 |
| TNFα adsorption amount | μg/cm$^3$ | | | | 81 | 14 | 109 |
| Pressure loss | kPa | 9 | 21 | 22 | | 5 | 6 |
| Increase in hemolysis rate | — | 0.5 | 1.2 | 1.1 | | 0.2 | 0.9 |
| Clearance | mL/min | 76 | 48 | 49 | | 36 | 50 |

Comparing Examples with Comparative Example 1, it is found that the adsorption performance of β2-microglobulin remarkably decreases as the filling rate decreases. This is because the amount of fibers is small, the liquid to be treated flows between the fibers, and the liquid to be treated is less likely to sufficiently come into contact with the fibers. Comparison between Example 1 and Comparative Example 2 shows that as a filling rate increases, the pressure loss increases and the hemolysis rate further increases. When the pressure loss is large, it is presumed that a shear stress applied to the blood cells is increased to cause hemolysis.

In the comparison between Example 1 and Comparative Examples 3 and 4, it is found that the pressure loss increases when the inner diameter of the housing portion is small, and the adsorption performance decreases when the inner diameter of the housing portion is large, with the fiber filling rate set to be about the same. It is presumed that this is because when the inner diameter of the housing portion is small, the flow rate per cross-sectional area increases, and when the inner diameter of the housing portion is large, the liquid to be treated does not flow to the outer periphery portion, and the fibers that do not contribute to adsorption performance are generated.

In the comparison between Example 1 and Comparative Examples 5 and 6, when the preparation method such as the winding conditions is changed, the fiber bundle meanders and the linear rate decreases. It can be seen that if it is less than 0.97, the pressure loss increases and the hemolysis rate further increases. When the pressure loss is large, a shear stress applied to the blood cells is increased. Furthermore, it is presumed that hemolysis was caused as a result of an increased chance of contact, collision, and abrasion between blood cells and fibers.

Comparison between Example 1 and Comparative Example 7 shows that when the value represented by wet Ra/dry Ra is beyond the patent range and less than 1.05, the adsorption amount of IgG increases. It is presumed that this is because polymer chains on the fiber surface are not sufficiently swollen.

In comparison between Example 1 and Comparative Example 8, when the dry Ra value and the wet Ra value are small, the adsorption performance of TNFα is remarkably low. Furthermore, the adsorption performance of β2-microglobulin is also deteriorated in the purification column produced using this fiber bundle. This is presumed that this is because when the fiber surface is smooth, the flow of the liquid to be treated in the vicinity of the surface becomes straight, and a boundary layer is generated.

In the comparison between Example 1 and Comparative Example 9, when the dry Ra value and the wet Ra value are large, the adsorption amount of IgG increases. Furthermore, it can be seen that the purification column produced using this fiber bundle increases the hemolysis rate. It is presumed that this is because hemolysis occurs due to increased chances of contact, collision, and abrasion of blood cells with irregularities on the fiber surface.

DESCRIPTION OF REFERENCE SIGNS

1: Purification column
2: Header
3: Distribution plate
4: Tubular case
5: Adsorbent
6: β2-MG clearance measuring circuit
7: Pump
8: Bovine blood for circulation
9: Bovine blood for clearance
10: Hot water bath
11: Disposal beaker

The invention claimed is:

1. A fiber bundle comprising a plurality of porous fibers that satisfies the following requirements (A) to (E):
   (A) the porous fiber has a non-hollow shape,
   (B) an arithmetic average roughness (dry Ra value) of a surface of the porous fiber in a dry state is 11 nm or more and 30 nm or less,
   (C) an arithmetic average roughness (wet Ra value) of a surface of the porous fiber in a wet state is 12 nm or more and 40 nm or less,
   (D) a value represented by wet Ra/dry Ra is 1.05 or more, and
   (E) a linear rate of the fiber bundle represented by (length of fiber bundle)/(length of one porous fiber) is 0.97 or more and 1.00 or less.

2. The fiber bundle according to claim 1, wherein when a diameter of an inscribed circle is defined as Di and a diameter of a circumscribed circle is defined as Do in a transverse cross-section of the porous fiber, a modification degree of the transverse cross-section of the porous fiber represented by Do/Di is 1.3 or more and 8.5 or less.

3. The fiber bundle according to claim 1, wherein the porous fiber has an average pore radius of 0.8 nm or more and 90 nm or less.

4. The fiber bundle according to claim 1, wherein the porous fiber has a homogeneous porous structure in a transverse cross-sectional direction.

5. The fiber bundle according to claim 1,
wherein the porous fiber has a surface opening ratio of 0.1% or more and 30% or less.

6. The fiber bundle according to claim 1, wherein an equivalent circle diameter of a transverse cross-section of the porous fiber is 10 μm or more and 1,000 μm or less.

7. The fiber bundle according to claim 1,
wherein an adsorption amount of IgG of the porous fiber is 13 mg/cm$^3$ or less.

8. The fiber bundle according to claim 1, wherein an adsorption amount of a tumor necrosis factor α (TNFα) of the porous fiber is 15 μg/cm$^3$ or more.

9. A purification column, wherein
the fiber bundle according to claim 1 is housed substantially in parallel to a longitudinal direction of a tubular case, and
the purification column comprises headers, having an inlet port and an outlet port for a liquid to be treated, are attached to both ends of the tubular case, respectively.

\* \* \* \* \*